United States Patent [19]

Koistinen

[11] Patent Number: 4,460,180
[45] Date of Patent: Jul. 17, 1984

[54] SEALING OF A SHAFT IN A CENTRIFUGAL PUMP AND A METHOD FOR EFFECTING THE SEALING

[75] Inventor: Pauli A. T. Koistinen, Joensuu, Finland

[73] Assignee: Outokumpu Oy, Helsinki, Finland

[21] Appl. No.: 505,223

[22] Filed: Jun. 17, 1983

[30] Foreign Application Priority Data

Jun. 22, 1982 [FI] Finland .................. 822245

[51] Int. Cl.³ .................. F16J 15/40; F16J 15/46
[52] U.S. Cl. .................. 277/3; 277/27; 277/67; 277/83; 277/135
[58] Field of Search .................. 277/3, 27, 83, 67, 135, 277/173

[56] References Cited

U.S. PATENT DOCUMENTS

| | | | |
|---|---|---|---|
| 770,600 | 9/1904 | Morcom | 277/3 X |
| 2,270,811 | 1/1942 | Leonard | 277/27 |
| 3,068,801 | 12/1962 | Murray | 277/3 X |
| 3,395,645 | 8/1968 | Vilet | 277/27 X |
| 3,731,940 | 5/1973 | Spruiell | 277/12 |
| 3,947,044 | 3/1976 | Friedrick | 277/3 |
| 4,076,260 | 2/1978 | Legoy et al. | 277/3 X |

FOREIGN PATENT DOCUMENTS 350309 10/1972 Sweden .

Primary Examiner—Robert S. Ward
Attorney, Agent, or Firm—Wood, Dalton, Phillips, Mason & Rowe

[57] ABSTRACT

A sealing of a centrifugal pump shaft. When the pump is at rest, the sealing is effected mechanically between surfaces with the aid of loading means, a sealing surface and a packing, and when the pump is in operation, the sealing is effected by means of a hydrodynamically effected fluid ring of the fluid being pumped, formed by means of auxiliary blades which are separate in relation to the impeller.

9 Claims, 3 Drawing Figures

SEALING OF A SHAFT IN A CENTRIFUGAL PUMP AND A METHOD FOR EFFECTING THE SEALING

FIELD OF THE INVENTION

The present invention relates to a sealing of the shaft in a centrifugal pump and to a method for producing the sealing. The shaft sealing according to the invention is hydrodynamically self-adjusting, and the opening force necessary in the hydrodynamic sealing is produced in accordance with the method according to the invention. The sealing in the rest position is achieved by means of known sealing materials.

DESCRIPTION OF THE PRIOR ART

In the pump sealing according to Swedish-lay open print No. 350 309 sealing water is used for producing a hydrodynamic sealing. Hereby the sealing is formed in an auxiliary blades box installed separately from the pump housing. Inside the walls of the auxiliary blades box channels have, moreover, been formed, in which the sealing water is circulated back from the outlet side of the pump to the suction side of the pump. Moreover, the auxiliary blades part making a hydrodynamic sealing possible is attached to the pump shaft so that it can be moved in axial direction, but the auxiliary blades part is in no way attached to the mechanical sealing part, which maintains the sealing of the pump when the pump is at rest.

In the sealing of a shaft according to U.S. Pat. No. 3,731,940 a fluid ring making the hydrodynamic sealing possible is formed both in the pump housing and in the auxiliary blades box attached beside the pump housing, into which is conducted special sealing fluid in order to form the fluid ring. When the pump is at rest the sealing of the shaft is effected mechanically by two elastic sealings specially manufactured for this purpose.

SUMMARY OF THE INVENTION

The object of the present invention is to eliminate the disadvantages of the state of the art described above and to provide a self-adjusting, hydrodynamic shaft sealing for centrifugal pumps.

In accordance with the invention, when the centrifugal pump is at rest, the sealing is produced by means of a spring, pneumatic, hydraulic or other force parallel to the shaft of the centrifugal pump, the force pressing the sealing surface of a coaxially placed sealing part against a seal placed in, for example, the top of the shaft aperture. At this time the pressure prevailing in the pump housing is the same as in the pipe system.

When the shaft sealing according to the invention is situated on the pump outlet side, at the time the pump starts a pressure of the value of the operating pressure of the pump is generated between the impeller and the auxiliary blades installed coaxially but separately from the impeller. At the same time the auxiliary blades cause fluid to be pumped from the space between the auxiliary blades and that pump housing wall which is perpendicular to the shaft, until an equilibrium of pressure is produced in the space between the auxiliary blades and the pump housing wall parallel to the shaft. At this time there prevails an equilibrium between the space delimited by the impeller and the auxiliary blades and the space delimited by the auxiliary blades and the wall perpendicular to the pump shaft. During the reaching of the equilibrium, a fluid ring is formed at the circumference of the auxiliary blades, and the internal pressure of this ring decreases from the outer circumference towards the inner circumference when there is no volume flow. The pressure at the inner circumference is the same as the external pressure of the pump. The thus produced high resultant of the pressure forces, with a high absolute value, cancels out the sealing force, e.g. spring force, which produced the sealing while the pump was at rest. At this time the sealing part, to which the auxiliary blades have also been fixed, slides in a direction parallel to the pump shaft, away from the impeller, at the same time opening the mechanical sealing which poorly resists the stresses caused by the rotation of the pump shaft. The sealing part can also be fixed to the shaft, in which case the auxiliary blades are also fixed to the shaft. In this case, when the mechanical sealing opens, the entire shaft with its impeller moves as the mechanical sealing force is cancelled out. When the pump stops, the value of the resultant force formed by the pressure forces is reduced and the spring or corresponding loading means again closes the sealing by pushing the sealing surfaces together, to their initial position. There may be one or several sets of auxiliary blades.

The shaft sealing according to the invention can also be placed on the inlet-flow side of the pump, in which case the sealing pressure generated by the auxiliary blades is the same as the pump inlet pressure.

In order to form advantageously the fluid ring to be used in the hydrodynamic sealing according to the invention, the mechanical sealing part can be provided with an auxiliary conical surface, the bevel of which faces so that the movement of the fluid caused by the centrifugal force is towards the outer edge of the auxiliary blades.

The auxiliary blades needed in the sealing of the shaft according to the invention can be fixed to the pump shaft by the aid of a wedge. Hereby it is advantageous to use mechanical, elastic sealing to the sealing between the shaft and the auxiliary blades. The wedge and the elastic sealing can preferably be replaced by bellows, which direct the movement of the auxiliary blades in the above-mentioned sealing points.

The shaft sealing according to the invention for centrifugal pumps is self-adjusting and leakless. Also, the shaft sealing is not dependent on other variables such as the speed of rotation of the shaft, since the pressure equilibrium utilized in the invention and the fluid ring thereby formed to effect the sealing are produced and can be maintained even at low speeds of rotation of the shaft. In addition, since the sealing is opened hydrodynamically, no separate actuator is needed for the opening, a fact which reduces the adjustment and maintenance requirement of the sealing, and thereby the operating costs of the pump, when the sealing system according to the invention is used.

The shaft sealing in accordance with the invention for a centrifugal pump is also simple in structure, which for its part reduces the manufacturing costs of the parts necessary for the shaft sealing. The sealing according to the invention does not wear off the packing or the sealing surface of the sealing part during use. These surfaces rub against each other only during the short moments of starting and stopping. Furthermore, the shaft sealing for centrifugal pumps has been designed so that it is the fluid which tends to leak that causes the sealing to close.

DESCRIPTION OF THE DRAWINGS

The invention is described below with reference to the accompanying drawings, in which.

DESCRIPTION OF THE PREFERRED EMBODIMENTS

Figure 1:
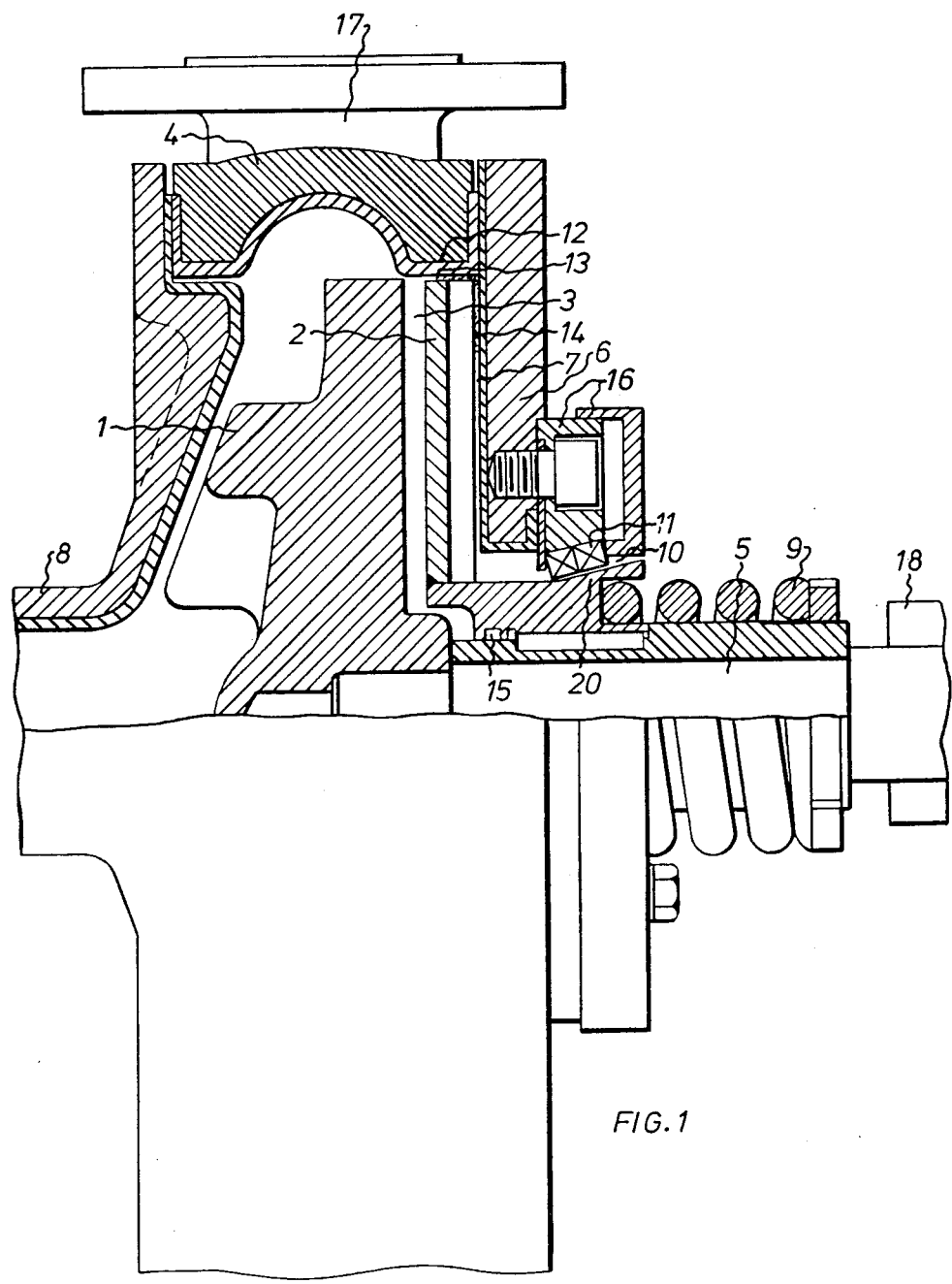
FIG. 1 depicts a side view, partially in cross section, of a preferred embodiment of the invention, when the centrifugal pump is in operation.

When the pump is at rest, a pressure according to the inlet pipe 8 of the pump housing of the centrifugal pump prevails in the space 3 between the impeller 1 and the auxiliary blades 2 and in the space 7 between the auxiliary blades 2 and the pump housing 4 wall 6 which is perpendicular to the shaft 5. In this case a loading member such as a spring 9 fitted around the centrifugal pump shaft 5 presses the sealing surface 10 against the packing 11 attached to the cover structure 16 of the pump aperture, thereby preventing leakage. The sealing part 20 which includes the sealing surface 10 is, furthermore, sealed against the shaft 5 it surrounds by means of a packing 15. Furthermore, an outlet pipe 17 is connected to the pump housing 4, and a mechanically operated means or motor 18 rotating the shaft 5 is connected to the shaft 5.

When the pump starts, the impeller 1 raises the pressure in the space 3 to the operating pressure value. At the same time the auxiliary blades 2 pump fluid from the space 7 until an equilibrium of pressure prevails in the space 13 between the auxiliary blades 2 and the pump housing 4 wall 12 which is parallel to the shaft. At the same time a fluid ring 14 is formed in the space 13 at the circumference of the auxiliary blades 2, the internal pressure of the fluid ring 14 decreasing from its outer circumference towards its inner circumference. The pressure at the inner circumference of the fluid ring 14 is the same as the external pressure of the centrifugal pump. The thus produced resultant of pressure forces, having a high absolute value, cancels out the force produced by the spring 9 or a similar loading means. This causes the sealing part 20, and at the same time the auxiliary blades 2, to move in a direction parallel to the shaft 5, away from the impeller 1, whereby the sealing 10–11 is also opened, as shown in FIG. 1. The sealing is effected at this time by means of the hydrodynamic fluid ring 14.

Figure 2:
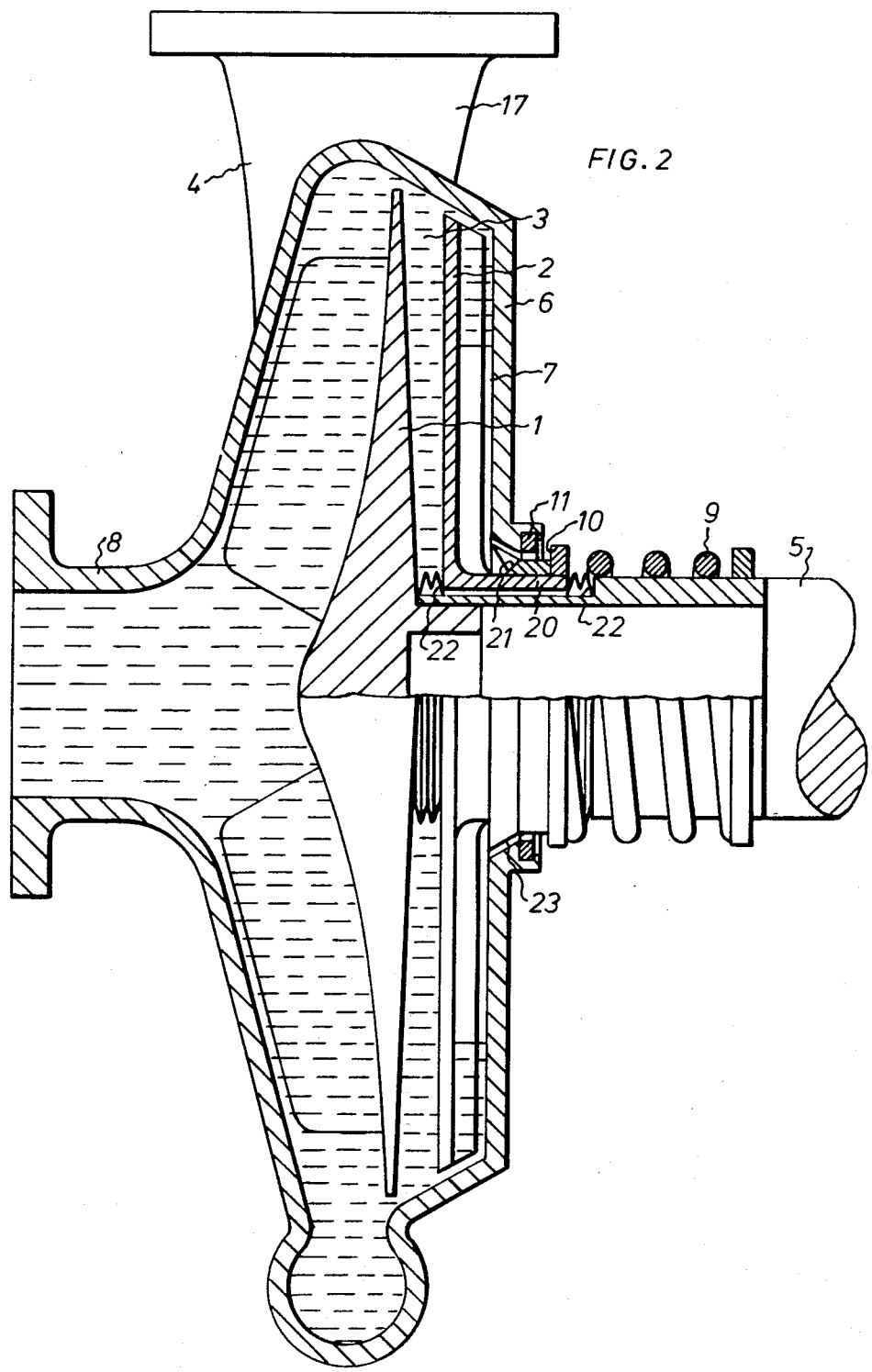
FIG. 2 depicts a side view, partially in cross section, of another preferred embodiment of the invention.

FIG. 2 depicts one embodiment of the invention, which has in practice proved especially advantageous. In the said structure all the reference numerals correspond to those in FIG. 1. In addition, details which make the embodiment in question advantageous have been given their own reference numerals 21 and 22. Reference numeral 21 indicates a beveled surface the bevel of which faces so that the movement caused by the centrifugal force is towards the outer edge of the auxiliary blade 2. Thus the fluid being pumped, which of course penetrates between the surface 21 and the respectively beveled frame surface 23 when the pump is at rest, begins to be flung effectively towards the outer edge of the auxiliary blade 2. It has been observed in practice that, when the said structure is used, none of the fluid being pumped can lead through the sealing under conventional conditions at any operating stage.

Another advantageous feature of the embodiment depicted in FIG. 2 is indicated by reference numeral 22, which indicates bellows, which can be of, for example, metal such as steel, and which can replace both the wedge connecting the auxiliary blade 2 to the shaft 5 and the sealing indicated by 15 in FIG. 1. Owing to their structure, the bellows are capable of transmitting a momentum which well suffices for rotating the auxiliary blade 2. Of course, a wedge can also be used if it seems more secure.

Figure 3:
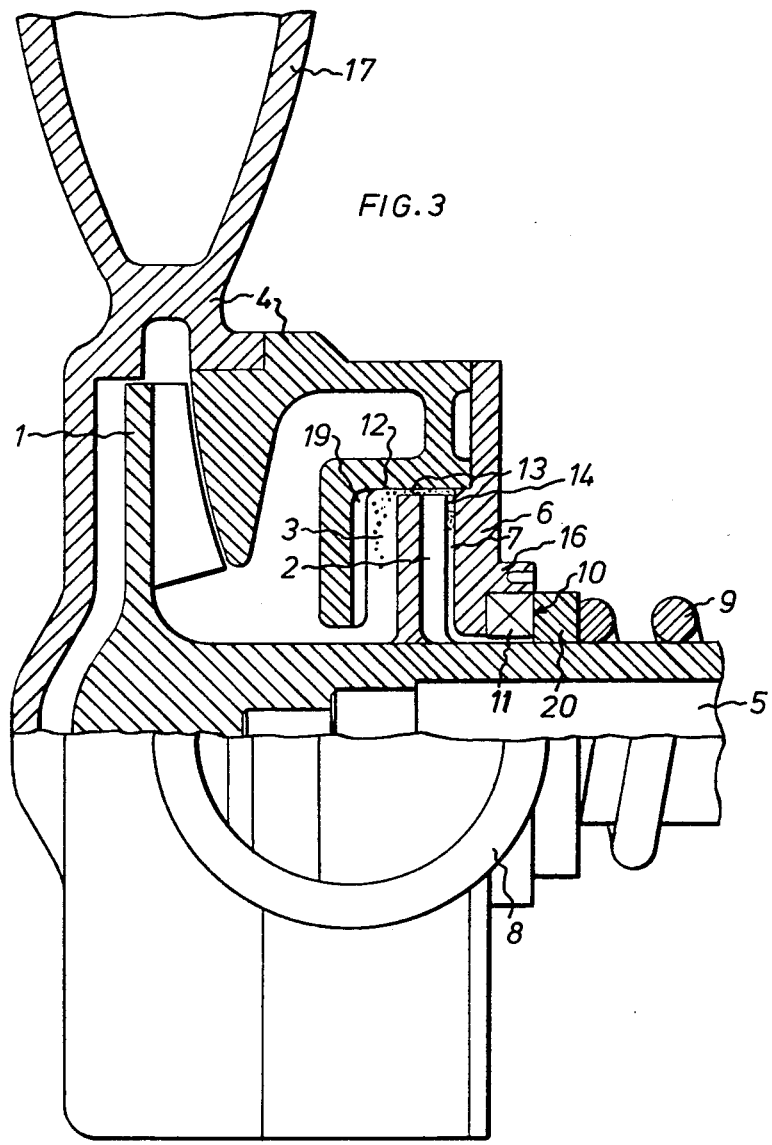
FIG. 3 depicts a side view, partially in cross section, of a preferred embodiment of the invention in which the shaft sealing is placed on the inlet flow side of the pump.

In accordance with FIG. 3, when the shaft sealing is on the inlet flow side of the pump fixed wall of the pump housing 4 can be placed between the impeller 1 and the auxiliary blades 2, and it is possible to install fixed blades 19 to this fixed wall in order to facilitate achieving the hydrodynamic equilibrium and in order to calm down the movement of the fluid in the space 3 behind the auxiliary blades.

When the pump stops the value of the resultant of the pressure forces decreases and the loading means 9 pushes the sealing part 20 to its original position and closes simultaneously the sealing 10–11.

What is claimed is:

1. A centrifugal pump comprising:
   a housing defining a pumping chamber having an outlet and an inlet spaced from the outlet;
   a rotatable shaft entering said chamber;
   mechanical sealing means including two relatively movable sealing surface for sealing the interface of said chamber and said shaft;
   means normally urging said sealing surfaces into sealing engagement with each other;
   an impeller within said chamber and mounted on said shaft for rotation therewith to deliver fluid from said inlet to said outlet; and
   auxiliary pumping blades separate from the impeller and carried by said shaft and axially movable thereon and associated with one of said sealing surfaces, said auxiliary blades being disposed within said chamber between said impeller and said sealing means so that upon rotation of said shaft, said auxiliary blades pump fluid from said interface toward said outlet to form an annular fluid ring hydrodynamically sealing said interface, and in response thereto move axially on said shaft to move said one sealing surface out of sealing engagement with the other sealing surface to minimize wear thereto during rotation of said shaft.

2. The centrifugal pump of claim 1, said housing has a generally radial wall closely adjacent said auxiliary pumping blades and said annular fluid ring is formed between said auxiliary pumping blades and said radial wall.

3. The centrifugal pump of claim 1 wherein said auxiliary pumping blades are connected to one of said sealing surfaces and said urging means comprises a spring disposed about said shaft and acting on said one sealing surface.

4. The centifugal pump of claim 1 further includes bellows interconnecting said auxiliary pumping blades and said shaft.

5. The centrifugal pump of claim 1 wherein said auxiliary pumping blades are located between said inlet and said outlet.

6. The centrifugal pump of claim 1 wherein said shaft enters said housing oppositely of said inlet.

7. A method for sealing the shaft of a centrifugal pump having a pumping chamber, a rotatable shaft entering the pumping chamber and mounting on impeller for delivering fluid from an inlet to an outlet, a mechanical seal including two relatively movable sealing surfaces sealing the interface of the chamber and the shaft and auxiliary pumping blades carried by the shaft and axially movable thereon and located between the impeller and the sealing means comprising the steps of:
producing a fluid ring in the chamber between the chamber wall and the auxiliary blades by rotating the shaft, the impeller and the auxiliary blades;
moving one of said sealing surfaces out of sealing engagement with the other by moving said one sealing surface away from said impeller in response to movement of the auxiliary blades axially on the shaft during the creation of said fluid ring; and
applying an urging force to said one sealing surface to normally urge said one sealing surface into sealing engagement with the other sealing surface.

8. A method according to claim 7, wherein the fluid ring is produced in a space situated on the outlet side of the pump.

9. A method according to claim 7, wherein the fluid ring is produced in a space situated on the suction side of the pump.

* * * * *